Jan. 2, 1951 R. E. MOORE 2,536,138
PROPELLER CONTROL
Filed Dec. 23, 1946 2 Sheets-Sheet 1
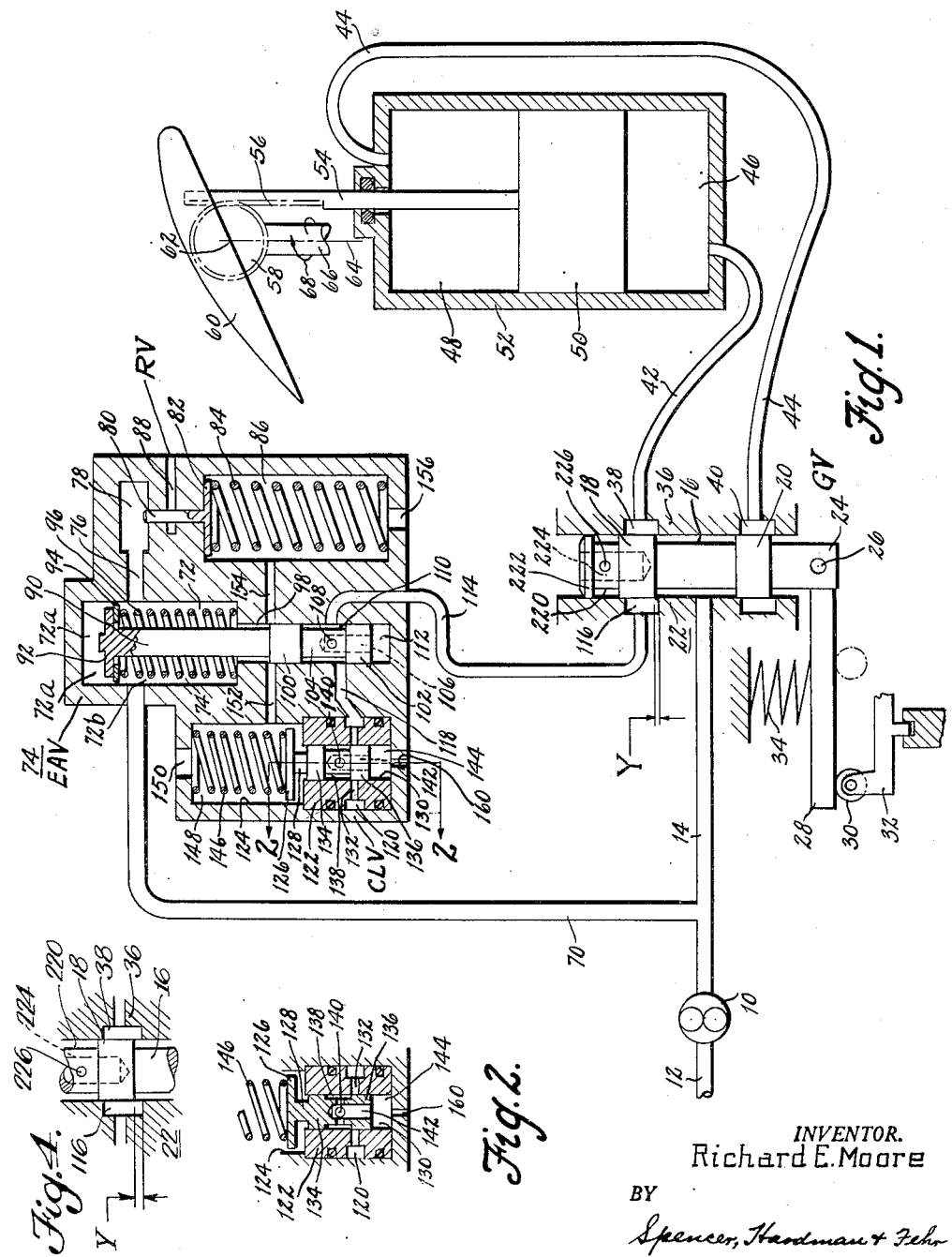
INVENTOR.
Richard E. Moore
BY
Spencer, Hardman & Fehr
His ATTORNEYS Patented Jan. 2, 1951

2,536,138

UNITED STATES PATENT OFFICE 2,536,138

PROPELLER CONTROL

Richard E. Moore, Dayton, Ohio, assignor to General Motors Corporation, Detroit, Mich., a corporation of Delaware Application December 23, 1946, Serial No. 718,071

15 Claims. (Cl. 60—52)

This invention relates to the control of variable pitch propellers, particularly those involving fluid pressure mechanism for shifting the blade pitch to accomplish desired ends.

One of the objects of the invention is to reduce the amount of off-speed of a governing system by increasing the proportionalizing rate of a control valve.

Another object of the invention is to provide a propeller control by which the propeller speeds are caused to follow closely and quickly acceleration and deceleration of the driving force.

Another object of the invention is to maintain the source pressure at a fixed amount above the pressure necessitated for operating one of the pitch control functions.

A further object of the invention is to provide a fluid pressure system of the variable pressure constant-leak type that will not interfere with maximum rates of pitch change and/or flow-sensitive feathering systems.

A further object is to provide a fluid pressure system and control apparatus therefor that will maintain the required pressure against the ever present blade load tending to shift to a predetermined position.

Still another object of the invention is to provide a governor controlled fluid pressure system of high potential, in which the governor becomes a true flow governor and only throttles pressure fluid through one port during normal operation, thereby removing all reversing flow forces from the governor valve, and maintaining a constant pressure drop across the governor.

Yet another object of the invention is to provide a fluid pressure system for the control of variable pitch propellers, which system will have maximum pressure sensitivity as well as produce an ideal constant pressure differential between source pressure and increase pitch port pressure.

Among other objects of the invention is to provide a fluid pressure system of control for variable pitch propellers whose blades have high centrifugal twisting moments tending to decrease pitch.

The indicated objects and advantages are accomplished by providing a pressure control unit of three element structure that incorporates an equal area valve operating in the nature of a pressure control valve which is constantly connected with a pump source and operates to meter flow through the increased pitch port of the governor valve and apply the pressure potential of that port to a constant-leak valve as a second element of the unit, and which operates to maintain a constant pressure differential between the increased pitch port of the governor and a pressure source. The third element of the unit is a relief valve constantly exposed to the source pressure for safe-guarding the system. With the governor valve so organized as to maintain a predetermined amount of negative overlap at the increased pitch port, then a predetermined flow of hydraulic fluid is delivered to one side of the blade torque unit and to the exit orifice of the constant-leak valve. In normal, or on speed operation, the quantative factor of leak and the pressure urge on the one side of the blade torque motor balances the centrifugal moment of rotative force on the blade tending to decrease the blade pitch, by means of which, for normal on-speed operation, the pitch of the blade is held substantially fixed for operation at the speeds selected by the governor valve.

In the drawings:

Fig. 1 is a fluid circuit diagram illustrating the application of the system.

Fig. 2 is a detail view in section showing a constant leak valve forming part of the apparatus of the instant invention, substantially as indicated by the line and arrows 2—2 of Fig. 1.

Fig. 4 is an enlarged detail of the port and land arrangement for the increased pitch port shown in Fig. 1.

Figure 3:
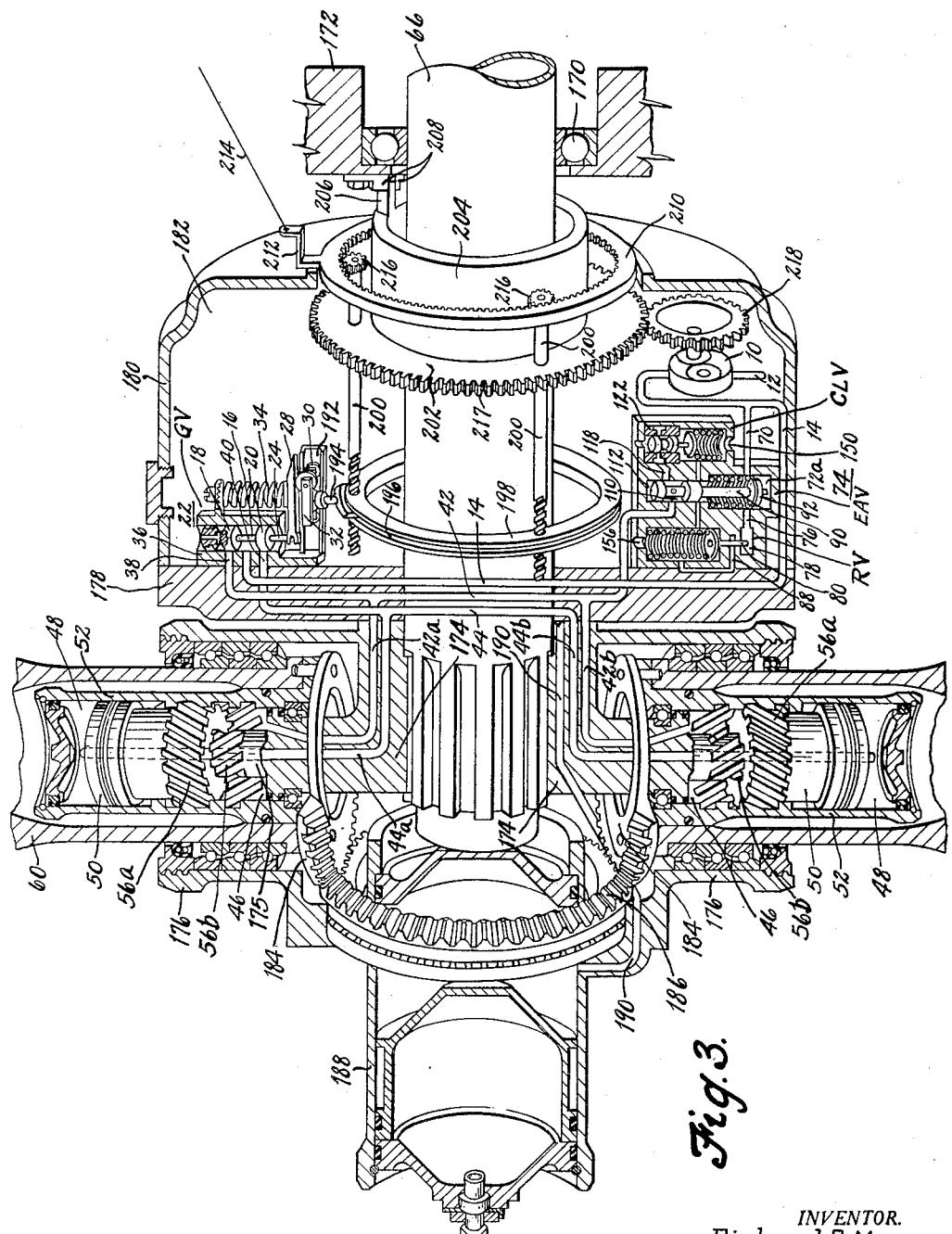
Fig. 3 is a schematic view of a propeller mechanism in longitudinal section and embodying the fluid circuit depicted in Fig. 1.

With particular reference to Fig. 1 of the drawings, which shows schematically the hydraulic circuit, 10 is a pump or pressure developing means drawing hydraulic fluid from a reservoir thru an intake 12 and feeds it to a pressure delivery line 14, leading to the shank 16 between lands 18 and 20 of a governor valve 22. The governor valve incorporates a stem extension 24 of the shank 16 that pivotally connects at 26 to a lever 28 resting on a movable fulcrum 30 secured to a carriage 32, the latter being manually adjustable as will presently appear for selecting a speed at which the governor valve is to control. The governor valve unit 22 is situated for response to centrifugal force acting toward the top of the sheet of drawing as shown in Fig. 1 and tending to compress a spring 34 which holds the lever 28 against the fulcrum 30, the valve plunger thereby being capable of sliding movement in a sleeve 36 providing an increased pitch port 38 and a decreased pitch port 40 adapted to cooperate with the equally spaced lands 18 and 20 of the valve plunger. From the control ports 38 and 40 tubular passages 42 and 44 lead to chambers 46 and 48 respectively on opposite sides a piston element 50 contained within a cylinder 52 constituting a blade torque unit for adjusting the pitch of the propeller. The piston 50 is therefore provided with a stem 54 having a toothed rack 56 engageable with a spur 58 affixed to the root of the blade 60 so as to rotate the blade in either direction about its pitch shifting axis 62. Considering that the propeller rotates upon an axis 64 by a shaft 66 in the direction of the arrow 68, then movement of the piston 50 toward the top of the view of Fig. 1 will so actuate the blade by rotating it around its pitch axis 62 as to increase its angle of engagement with the air stream thus increasing the blade pitch.

A branch line 70 leading from the pump pressure line 14 opens into a chamber 72 forming a damping chamber 72a and pressure regulating chamber 72b for an equal-area valve 74, a secondary connection 76 opening from the chamber 72 into a pocket 78 into which extends a piston 80 having a flat head 82 engaged by a spring 84 contained with a chamber 86. The piston 80 is always subject to the pump pressure within the pocket 78 and is urged to the extended position illustrated by the spring 84 but is subject to depression by the pressure within pocket 78 until flow is established to the drain slot 88 which will relieve an excess of pressure that may occur in the pressure lines 70 and 14.

The equal area valve, so called because the effective actuating areas exposed to the pump or source pressure and to motivating pressure are equal and opposite as will presently appear, comprises a stem 90 having a head 92 substantially less in diameter than the bore of the chamber 72 and which is engaged by a damping washer 94 having a clearance in bore 72 substantially small enough to resist rapid motion of stem 90. Adjacent the underside of the head 92 there is a spring 96 engaging the bottom of the chamber 72. A small axial bore 98 houses a valving portion of the stem 90, and opens into laterally extended fluid passages as will presently appear. The stem 90 is provided with a valving land 100 and a valve and guide land 102 separated by a shank portion 104 and all contained within the bore 98. An axial bore 106 extending from the lower end of the stem 90 upwardly intersects one or more cross bores 108 that open thru the shank portion 104 of the valve so as to establish communication between an annular groove 110 about the shank between the lands 100, 102, and a pressure chamber 112 at the bottom of the bore 98. Communicating with the annular groove 110 there is a passage 114 that leads to a groove 116 always communicating with the increased pitch port 38 of the governor valve 22. A second passage 118 communicating with the annular groove 110 opens into a channel 120 in the porting cylinder 122 of a constant leak valve, flow through the passage 118 being controlled by the land 102. The porting cylinder 122 is disposed within a chamber 124 housing a plunger 126 having a landed stem 128 contained within a bore 130 of the cylinder 122, the bore 130 having cross passages 132 connecting it with the annular groove 120. Thus, it will be observed that the potential of pressure occurring at the increased pitch port 38 will always be applied through the conduit 114 to the annular groove 110, and the pressure chamber 112, and under certain conditions to the cross passage 118 and the annular groove 120. The stem 128 provides a guide land 134 spaced from a valving land 136 separated by a shank portion 138 which is characterized like the spaced lands of the equal-area valve to connect the annular groove about the shank 138 with the lower end of the valving land through a port 140 and axial bore 142 shown in sectional detail in Fig. 2. The valve stem 128 with its land 136 cooperates with cross passages 132 to regulate the amount of hydraulic fluid moving from the passage 118 to the chamber 144 at the lower end of the stem 128, increase of pressure in the chamber 144 tending to raise the stem such that the land 136 cuts off the flow thru the ports 132, and being resisted by a spring 146 contained within an exhaust chamber 148 at one end of the chamber 124. The exhaust chamber 148 is ported to the outside of the valve unit at 150 and has a cross passage 152 extending from the chamber 148 and opening into the bore 98 of the equal-area valve in the region of one end of the valving land 100 of the stem 90, an extension passage 154 leading from the bore 98 into the exhaust chamber 86 of the relief valve which has a port of exist 156. It will be observed that the passages 152 and 154 constitute drain passages for the equal-area valve and are controlled by the valving land 100 of the stem 90 which controls communication of these passages with the pump line pressure thru the bore 98 opening into the chamber 72.

Briefly, variation of pressure at the increased pitch port 38 and groove 116 of the governor 22 is applied to the conduit 114 and to the annular groove 110 and thence thru the opening 108 and axial bore 106 to the pressure chamber 112. A rise or fall of pressure in 112 alters the flexure of the spring 96 tending to raise the valve stem 90 for closing the passages 152 and 154. If the pressure in chamber 112 increases, then the force applied to the valve stem 90 will assist the spring 96 and the centrifugal force of propeller rotation in covering the orifices into the passages 152 and 154 by the land 100. When those ports or passages are closed to pressure within the chamber 72 the potential within pump line 70 and 14 builds up and may be so great, if no regulation is provided, as to cause a blow off of the relief valve thru the port 88. That blow off is partially prevented by the potential of pump line pressure applied thru the passage 70, chamber 72 and bore 98 to the end area of the valving land 100. The spring engagement with the head 92 of the valve is such as to provide controlled damping movement of the equal-area valve 74. The spring 96 engages the damping washer 94 which in turn engages the head or flange 92 in a loose manner, that is to say, it is only in contact therewith but is guided by the bore of the chamber 72 while the circular opening is of larger diameter than the diameter of the stem 90 that passes thru it. That provides for eccentricity of, or misalignment of, the bores or chambers 72 and 98 without binding or unduly resisted movement of the lands 100 and 102 within the bore 98, since the flange 92 may be off center with respect to the chamber 72. The washer 94, however, is centrally disposed in the chamber 72 and its clearance with the side wall of the chamber can be dimensioned to provide the rate of damping desired.

A further variation in the upward movement of the equal area valve 90 is accomplished thru the action of the constant-leak valve 126. As heretofore stated, the pressure potential occurring at the increased pitch port 38 may be present in the annular passage 120 and cross passages 132 and is there controlled by the valving effect of the land 136 which admits that pressure potential thru the passages 140 and 142 to the pressure chamber 144. Thus, if the pressure in 144 is increased, the land 136 will be raised somewhat to close the ports 132 which finally may stop further movement of the stem 128 were it not for a carefully dimensioned bleed orifice 160 that provides a constant leak thru the lines mentioned extending from the increased pitch port 38. As soon as land 136 moves upward or is raised, the flow through ports 132 is reduced and the pressure in 144 is reduced and that is followed immediately by a downward movement of land 136 to further open the ports 132 and increase the pressure in chamber 144. There results through the cooperation of those elements a constant leak through the orifice 160. Except for conditions hereinafter stated, there will be a continual flow of hydraulic fluid from the pressure line 14 thru the increased pitch port 38, 116, line 114, groove 110 of the equal-area valve, and then thru the constant-leak valve to exit at the port 160. Since the annular channel 110 is always connected to the pressure chamber 112, the assisting effect applied to the spring 96 will be under the control of the constant-leak port 160.

The passages 152, 154 and 118 are disposed in such relation to the land 100 and 102 of the stem 90, that there exists at least a slight metering of the flow into the passage 118 by the time that the drain through the passages 152 and 154 is cut off. When the orifice from the bore 98 into the passage 118 is less in area than that of the leak orifice 160 then the rate of leak is diminished and the pressure in chamber 144 drops because of the lessened flow of fluid thereto. However that produces no substantial change in the pressure line over what is wrought by the diminished flow through 118. That restriction, of course, occurs only when there is a considerable and sudden drop in pressure potential within the line 70 that effects closing of the blow off ports 152 and 154. The line experiencing a sudden fall in pressure potential, the branch from the increase pitch port 38 to the constant-leak device is temporarily restricted or perhaps entirely closed off to afford a more rapid recovering of the working potential in the pressure line. Sudden build-up of pressure following those conditions is amply guarded against by the relief valve 80 and the pressure control or equal-area valve which opens the orifice to 118 just as soon as the pressure in the line 70 will accommodate the flow or leak from port 160 and yet supply the system for governed operation.

Applying the same principles exhibited in the schematic diagram of Fig. 1, provides the sectional pictorial view of Fig. 3 where the elements shown in Fig. 1 have been distributed around the propeller shaft 66, supported by the bearings 170, carried by an engine nosing or gear casing 172, and from which the shaft rotatably extends to drivingly support a propeller hub 174, providing sockets 176, journalling the blades 60 for pitch shiftable movement about their longer axes, and for revolution about the axis of the shaft 66. Rotatable with the shaft and hub there is a regulator comprising an annular plate 178 and a cover member 180 that cooperates to provide a reservoir 182 housing the control apparatus of Fig. 1, and here designated as the governor valve GV, a relief valve RV, and equal area valve EAV, the constant leak valve CLV, and a pump or pressure creating device 10. These elements are so mounted upon the regulator plate 178 as to properly take advantage of centrifugal force of rotation when considering that the regulator supporting and enclosing these elements is rotated about the propeller shaft 66 as an axis. Fluid passages extend from the pump to the various element of the control apparatus in accordance with the principles expressed with respect to Fig. 1, the pitch increase line 42 and the pitch decrease line 44 each having branches 42a and b and 44a and b respectively leading to the appropriate chambers 46 and 48 of the two blades here shown. Instead of the rack or gear connection between the piston and blade as shown in Fig. 1, the piston 50 of Fig. 3 has splined engagement at 56a with the cylinder 52, and at 56b with a spindle 175 of the hub 174. Lineal movement of piston 50 rotates the blade 60 in its socket relative to the spindle 175 by reason of the double helical splines 56a and 56b. Each of the blades is provided with a blade gear 184 that meshes with a master gear 186 adapted to keep the blades in track and insure that as one blade changes in pitch the other will also change in pitch an equal amount. Also included in Fig. 3, there is an accumulator 188 disposed axially of the hub 174 and providing a pressure line 190 adapted to connect into the system for use in connection with feathering and unfeathering of the propeller blade, where that function is desired. However, since the feathering function plays no particular part in the novel control of pitch that is herein described, it is not deemed necessary to enter into the description of blade feathering.

The control apparatus embodied within the regulator 180 is always under control of the pilot in-so-far as the governor valve GV may be set at any time to establish a speed level at which the automatic mechanism is to control. It has been stated earlier, that the fulcrum roller 30 is mounted on a movable carriage 32 for selecting a speed at which the governor valve will control, and that is accomplished in Fig. 3 by supporting the carriage 32 between a pair of guide ways 192 with an extension or shoe 194 of the carriage engaging a groove 196 of a control ring 198. The control ring encircles the shaft 66 and is slidable longitudinally thereof by means of high-lead control shafts 200 threaded into the ring 198 and journaled in a flange 202 of a sleeve 204 maintained against rotation with the propeller, by means of a lug 206 engaging between brackets or clips 208 secured to the engine nosing 172. A ring gear 210 is provided with a lever 212, and a control cable or rod 214 outside of the cover 180, engages pinions 216 fixed to the ends of the control shaft 200, so that oscillation of the lever 212 rotates the screw shaft 200 and causes axial movement of the control ring 198 within the regulator. The flange 202 is prepared with a toothed periphery 217 to engage a pinion 218 that drives the pump 10. When the propeller is in operation, it will be observed that the control ring 198, the screw shafts 200, the sleeve 204 with its attached spur gear 217 are all non-rotative because of the interengagement provided by 206 and 208, which means that the propeller with the regulator containing the control apparatus rotates outside of this group of elements, and is known as an adapter assembly. The pump gear 218 rolling over the spur 217 effects development of pressure by the pump 10 within the lines 14 and 70 of the system which pressure is regulated by the three element pressure control valve and delivered to the governor valve. The speed of propeller rotation will be determined by the position of the fulcrum roller 30 along the length of the lever 28, since that position determines at what speed of rotation centrifugal force acting upon the governor valve plunger thru the lever arm between the point 26 and engagement with the roller 30 will just balance the force of the spring 34 applied to the lever 28 thru the length of the arm between the point of spring pressure and point of fulcrum engagement. The relation of these working arms may be altered by actuating the arm 212 of the ring gear which in turn effects the shifting of the control ring 198 and consequently moves the carriage 32 along the ways 192 substantially as shown and described in the patents to Blanchard et al. 2,307,101 and 2,307,102.

During on-speed operation, the lands 18 and 20 of the governor valve will so coincide with the ports 38 and 40 as to result in equal forces being applied to both sides of the piston 50 of the blade motor 52 of which there will be no blade shift movement. In the present instance, because of the natural tendencies of the blade while in operation to seek a decreased pitch position, the particular coincidence of governor lands and ports during on-speed will involve a slight amount of predetermined offset as designated at Y in Fig. 1. That particular predetermined offset takes into account the tendency of the blade to move to decrease pitch position, and permits an exactly balancing force of hydraulic pressure to be applied to the chamber 46 of the blade motor for opposing the built in tendency of decreased pitch shift. The off-set also maintains a continual flow from the pressure line 14 thru the passage 114 and has been described to exit at the constant leak orifice 160. Upon the occurrence of increase in speed the governor valve moves outwardly, upward as shown in Fig. 1, which increases the opening of the increased pitch port and allows sufficient pressure application to the passage 42 and the chamber 46 to move the piston 50 for increasing the pitch of the blade 60 for effecting the increase in the load placed upon the motor and consequently reflecting in a decrease of speed, in the meanwhile the chamber 48 draining thru the passages 44 and port 40 to return to the reservoir. Upon the occurrence of decrease in propeller speed, less centrifugal force is applied to the governor valve by reason of which the spring 34 moves the governor valve plunger inwardly, first, such as to completely cover the increased pitch port 38 and the decrease pitch 40, or so as to absorb the off-set Y. That shift in itself so disturbs the balance of forces applied to the chambers 46 and 48 as to allow blade 60 to shift toward the decreased pitch position against the removal of pressure application that has been theretofore exerted in 46. If that release of opposing pressure thru the passage 42 that is afforded by means of the constant leak orifice 160 is insufficient to provide enough correction, then further inward movement of the governor valve plunger opens the port 40 to the pressure line and the increase pitch port 38 to drain. In order to restrict the rapidity of drain from the chamber 46, the governor valve provides an annular groove 220 between the land 18 and a third land 222 adjacent the increased pitch portion 38. An axial bore 224 and a cross port 226 opens the channel to the outer end of the governor valve, such that when the increased pitch port 38 is exposed to drain flow therefrom is restricted to that of a quantity that will prevent hunting or speed variation from the adjusted speed level. Thus, in drain from the chamber 46 thru the port 38 the hydraulic fluid must pass thru the restricted port 226 and thence thru the axial bore 224, all as is more amply described and claimed in the copending application filed by me on October 8, 1945 as Ser. No. 621,004.

The operation of the disclosed system as effected by the three element pressure control valve is as follows: the constant-leak valve CLV maintains a constant leak from the increased pitch port 38 as long as the line is open to the valve with a pressure of as much as 200 p. s. i. This leak is produced by the valve maintaining a constant pressure of 200 p. s. i. against the orifice 160. In the preferred embodiment the amount of flow through this orifice at 200 p. s. i. is approximately 60 cubic inches per minute, which in the said preferred embodiment is equivalent to about 1° per second rate of pitch damage. The equal-area valve EAV maintains the approximate position shown in the sketch during normal operation, or during the equilibrium position as it is sometimes referred to, and controls the pump operating pressure, maintains it at a fixed amount above the pressure at the increase pitch port 38. The equal area valve closes only when the governor valve GV is wide open at one of the control ports calling for the full available rate of pitch change, which happens only in extreme cases, such as during feathering and unfeathering operations. When the equal-area valve EAV closes, the line from the increase pitch port 38 to the leak valve CLV is shut off at 118, from which it will appear that the leak valve CLV does not interfere with the maximum rate of pitch change and flow-sensitive feathering systems. The pressure relief valve RV limits the system pressure and operates only in extreme cases where the equal-area valve EAV may be overdamped. The amount of offset of control land and port designated at Y in Fig. 1, is large enough to supply the constant leak and maintain the required pressure against the ever present blade load tending to decrease pitch. If an overspeed occurs, the distance Y increases supplying more flow which increases the blade angle. If an underspeed occurs, the distance Y decreases reducing the supply to the leak valve CLV which decreases the blade angle. Since the leak valve CLV is producing a constant leak the blade angle decreases at the rate of the difference in the constant leak and the amount of flow being supplied thru the governor GV.

The governor valve GV now becomes a true flow governor. The approximate 1° per second rate of decreased pitch is adequate to take care of normal operation in the described embodiment which includes the usual maneuvers within the operating range of the pursuit plane. The governor GV only throttles oil thru the increase pitch port 38 during normal operation. All reversing flow forces are removed from the governor valve and the constant pressure difference from the pump line 14 to the increase pitch line 42 is controlled by the lead of the spring 96 in the equal-area valve EAV, which can be kept to a reasonable amount for controlling the one flow force now left in the governor GV during normal operation. Since the equal-area valve EAV maintains a constant pressure drop across the governor the most ideal porting for a given installation can be obtained. The equal-area valve EAV gives the system maximum pressure sensitivity as well as produces the ideal constant pressure difference between pump 10 and increased pitch line 42. High pressure sensitivity is needed because of the friction effect of the blade motor unit 50, 52.

While the embodiment of the present invention as herein disclosed, constitutes a preferred form, it is to be understood that other forms might be adopted, all coming within the scope of the claims which follow.

What is claimed is as follows:

1. A fluid pressure system including a fluid motor working against opposing forces of widely varying magnitude, a fluid pressure source, a distributor valve automatically operable to distribute the source of pressure to the fluid motor for just balancing the opposing forces on the motor, and a pressure control means operatively connected to the pressure source and to the fluid motor for maintaining a definite pressure differential between the pressure source and the pressure distributed to the fluid motor, which pressure differential balances out the difference in magnitude of said forces opposing the fluid motor while the motor is inactive, said pressure control means including a constant leak orifice, and a valve having equal areas subject to the pressure source and to the pressure distributed to the fluid motor for controlling flow from the leak orifice.

2. The combination set forth in claim 1 wherein the source pressure applied to the equal area valve is opposed by the pressure distributed to the fluid motor.

3. The combination set forth in claim 1 wherein the leak orifice is controlled by a valve open at all times to the pressure distributed to the fluid motor, said orifice control valve being responsive to a predetermined pressure rise in the motor to stop all flow through said orifice.

4. The combination set forth in claim 1 wherein the distributor valve includes a land and port connected with the fluid motor and off-set in non-coincidence a predetermined amount for establishing a continual rate of flow of fluid from the pressure source through said distributor port and to one area of the pressure control valve controlling flow from the said leak orifice.

5. A fluid pressure system including a fluid motor working against widely varying opposing forces, a fluid pressure source, a governor valve with fluid ports connected to opposite sides of said fluid motor, and automatically operable to distribute the pressure source to the fluid motor for successfully resisting opposing forces encountered, so that the fluid motor may be held inactive, while one of said ports is slightly open to source pressure, pressure control means connected between the said port and the source pressure and including a constant leak orifice and a valve for controlling flow through said orifice in response to pressure differentials between the source pressure and the fluid motor applied pressure, said flow control valve having equal opposed areas exposed to the source pressure and to the motor applied pressure and adapted upon rise of motor applied pressure to diminish flow toward said orifice, and a pressure operated metering valve operable upon increase of flow from the flow control valve to reduce the flow to said orifice.

6. A fluid pressure system including a fluid motor working against widely varying opposing forces, a fluid pressure source, a governor valve with fluid ports connected to opposite sides of said fluid motor, and automatically operable to distribute the pressure source to the fluid motor for holding the fluid motor inactive and for operating the fluid motor in opposite directions, one of said ports when the fluid motor is inactive being open to source pressure by a predetermined amount, pressure control means including a leak orifice, and a valve for controlling the flow of fluid from the orifice to match the flow from said governor port, said orifice control valve including a pressure reducing element hydraulically actuated to restrict flow to the orifice upon increase of pressure; and an equal area valve having one piston face exposed to source pressure and adapted to relieve that pressure upon an undue rise in the system, and having an opposed piston face of equal area exposed to the pressure at said one governor port, means providing a port controlled by the equal area valve for controlling the flow from the said one governor port to the pressure reducing element, said equal area valve tending to close the port to the pressure reducing element upon increase of pressure at the said governor port, and operating upon wider governor port opening to increase the source pressure commensurate with the demands of the force to be opposed by said fluid motor.

7. A fluid pressure system including a fluid motor working against widely varying opposing forces, a fluid pressure source, a governor valve with fluid ports connected to opposite sides of said fluid motor, and automatically operable to distribute the pressure source to the fluid motor for holding the fluid motor inactive and for operating the fluid motor in opposite directions, one of said ports when the fluid motor is inactive being open to source pressure by a predetermined amount, pressure control means including a constant leak orifice, and a valve for controlling the flow of fluid from the orifice to match the flow from said governor port, said orifice control valve including a pressure reducing element hydraulically operated to restrict flow to the said orifice upon increase of pressure, an equal area valve providing a pair of spaced lands and opposed faces exposed to source pressure and to pressure of the said governor port, a port and passage controlled by each land, one of said port and passage being opened to drain upon undue rise of pump pressure, the other port and passage connecting the pressure reducing element with the said governor port and adapted to be at least partially closed by one of said lands upon increase of pressure at the said governor port, said equal area valve operating upon decrease of governor port opening to increase the fluid flow through said leak orifice.

8. In a fluid pressure system, a pressure control unit for maintaining a pressure potential in the system of greater magnitude than that demanded for work devices operable by the system, said control unit comprising a valve controlled leak orifice, a pressure controlling valve determining the flow to the valve controlled leak orifice and having a first area exposed to the source pressure and adapted upon predetermined rise thereof to relieve the source pressure, and having a second area of said valve opposing the said first area and exposed to the pressure delivered to the work device whereby to oppose the relief of said source pressure, said valve controlled leak orifice having a throttling valve controlling flow to the orifice, a pressure supply passage for the throttling valve, and means responding to an increase of pressure on the said second area of the pressure controlling valve for interrupting flow pressure supply to said throttle valve.

9. In a fluid pressure system for actuating a fluid pressure motor to adjust the pitch of blades on aircraft propellers, through a wide range of angles, comprising in combination, a source of fluid pressure for application to said fluid pressure motor, a flow governor for directing the pressure source to the fluid pressure motor for holding the motor inactive and for actuating the motor in opposite directions, said governor having a pair of spaced ports connected to opposite sides of said motor and one of which ports is partially open to source pressure upon inactive status of said motor, valve means for maintaining a constant pressure drop across the said one governor port, and means providing a constant leak of predetermined magnitude from said governor port, and subject to the control of said valve said last mentioned valve having opposed equal areas subjected to the source pressure and to the pressure at the partially open governor port, a spring assisting the pressure at said governor port for moving said valve in opposition to the source pressure, and a port controlled by the movement of said valve for reducing the flow to said constant leak as the pressure at the partially open governor port increases.

10. In a fluid pressure system for actuating a fluid pressure motor to adjust the pitch of blades on aircraft propellers, through a wide range of angles, comprising in combination, a source of fluid pressure for application to said fluid pressure motor, a flow governor for directing the pressure source to the fluid pressure motor for holding the motor inactive against the ever present tendency to move to decrease pitch, and for actuating the motor in opposite directions for increasing and for decreasing the pitch of the blades, said flow governor having an increase pitch port and a decrease pitch port each connected with opposite sides of said motor, a pressure control unit for controlling the potential of pressure applied to said motor and including a valve for controlling the potential of pressure at said source and varying it as needed at said governor ports, said valve having equal areas exposed to the source pressure and to the pressure at the increase pitch port of said governor and being assisted by spring means for maintaining the pressure of said source, a leak orifice and a controlling valve therefor maintaining a constant leak from the increase pitch port of the governor, flow of pressure fluid to the said control valve being under the control of the first said valve, and a valve exposed at all times to the potential of the source pressure for limiting the potential thereof to a safe value.

11. The combination set forth in claim 1, wherein the leak orifice is controlled by the combined action of two valves, one of which is open at all times to the pressure distributed to the fluid motor and operates to control the flow to the other, and means whereby said one valve will upon extreme demands of flow by said fluid motor stop all flow to said other valve and through said orifice.

12. In a fluid pressure system for actuating a fluid pressure motor to adjust the pitch of blades on aircraft propellers, through a wide range of angles, comprising in combination, a source of fluid pressure for application to said fluid pressure motor, a flow governor for directing the pressure source to the fluid pressure motor for holding the motor inactive and for actuating the motor in opposite directions for increasing and for decreasing the pitch of the blades, said flow governor having a pair of spaced ports connected to opposite sides of said motor and one which ports is partially open to source pressure during inactive status of said motor, such that said governor then throttles pressure fluid through only the said one port during normal operation, a pressure control unit for controlling the potential of pressure applied to said motor and including a valve for controlling the potential of source pressure and for varying the source pressure as needed at said governor ports, said valve having equal opposed areas, one of which is constantly exposed to the source pressure and the other area of which is constantly exposed to the pressure at said one governor port and assisted by a spring to oppose the source pressure on said one area, an orifice and pressure actuated flow control valve having a port controlled by said first mentioned valve for matching the leak through said orifice to compensate for the flow through said one governor port.

13. In a fluid pressure system for actuating a fluid pressure motor to adjust the pitch of blades on aircraft propellers, through a wide range of angles, comprising in combination, a source of fluid pressure for application to said fluid pressure motor, a flow governor for directing the pressure source to the fluid pressure motor for holding the motor inactive and for actuating the motor in opposite directions for increasing and for decreasing the pitch of the blades, said flow governor having a pair of spaced ports connected to opposite sides of said motor one port of which throttles fluid pressure to one side of the motor while the motor is held inactive, control means maintaining a pressure differential between the source pressure and the throttled pressure at said one port, said control means including a piston and cylinder having opposite equal areas exposed on the one hand to source pressure, and on the other hand to the throttled pressure at said one governor port, a port controlled by said piston and normally exposed to the throttled pressure of said flow governor, means controlling the flow from said piston controlled port to provide a constant leak from the system while the said pressure differential is maintained, said controlling means including a constant leak orifice, and a flow control valve between the said orifice and the piston controlled port, spring means operable upon said piston to assist the throttled pressure in closing the piston controlled port when the said pressure tends to decrease.

14. The combination set forth in claim 13 wherein said flow governor includes speed sensitive means for increasing the said one governor port opening in response to overspeed to throttle more fluid pressure to the fluid motor for pitch increase of the blades, and means including said piston and cylinder responding to the increased throttling of fluid pressure at said one governor port for increasing the source pressure.

15. The combination set forth in claim 13 wherein said flow governor includes means sensitive to speed for decreasing the said one governor port opening in response to under speed to throttle less fluid pressure to the fluid motor for pitch decrease of the blades, and means including said piston and cylinder responding to decrease throttling of fluid pressure at said one governor port for decreasing the source pressure, and maintaining said pressure differential.

RICHARD E. MOORE.

REFERENCES CITED

The following references are of record in the file of this patent:

UNITED STATES PATENTS

| Number | Name | Date |
|---|---|---|
| 1,467,522 | Amsler | Sept. 11, 1923 |
| 1,972,462 | Schafer | Sept. 4, 1934 |
| 2,167,328 | Beggs | July 25, 1939 |
| 2,384,774 | Smallpeice | Sept. 11, 1945 |